United States Patent
Bieri

[19]

[11] Patent Number: 5,915,776
[45] Date of Patent: Jun. 29, 1999

[54] INSTRUMENT PANEL FOR A VEHICLE

[75] Inventor: Frédéric Bieri, Bucheres, France

[73] Assignee: Reydel Société Anonyme, Gondecourt, France

[21] Appl. No.: 09/079,004

[22] Filed: May 14, 1998

[51] Int. Cl.[6] .................................................. B60R 7/06
[52] U.S. Cl. .......................................... 296/37.12; 296/70
[58] Field of Search ................................... 296/37.12, 70

[56] References Cited

U.S. PATENT DOCUMENTS

| 4,811,981 | 3/1989 | Benson ................................. 296/37.12 |
| 5,385,378 | 1/1995 | Hakamada et al. .................. 296/37.12 |
| 5,743,585 | 4/1998 | Pranger et al. ....................... 296/37.12 |

FOREIGN PATENT DOCUMENTS

| 3802801 | 8/1989 | Germany ............................. 296/37.12 |
| 3816407 | 11/1989 | Germany ............................. 296/37.12 |
| 67732 | 3/1991 | Japan ................................... 296/37.12 |

*Primary Examiner*—Gary C. Hoge
*Attorney, Agent, or Firm*—Harrison & Egbert

[57] ABSTRACT

An instrument panel for a vehicle, particularly for an automobile, including:
  at least one first reserved space (1), designed at least to accommodate different components of interior accessories and defined at least partially at the level of one casing component (2), concealing at least partially the running board (3) of the aforementioned vehicle, and
  framework mechanisms (4) acting together with the aforementioned casing component (2) and/or the aforementioned first reserved space (1), the accessory components being fitted to be secured to the walls of the aforementioned first reserved space (1), and being detachable.

9 Claims, 5 Drawing Sheets

INSTRUMENT PANEL FOR A VEHICLE

TECHNICAL FIELD

The invention presented here involves an instrument panel for a vehicle, particularly for an automobile.

However, though it is most particularly planned for applications of this sort, it can also be used in any other type of nautical, air, or land vehicle.

During their journey, the driver and/or the passengers of a vehicle often wish to have different objects within their reach in order to be able to work and/or for entertainment, with these being both outside as well as inside the vehicle. In some cases, a set comfort position or even a large storage space can also be of interest to them.

Some individual accessories have been proposed for these various purposes. However, the corresponding solutions are not satisfactory since there is little uniformity and they can not be integrated in an interchangeable manner into a common structure.

In addition, the instrument panels currently known generally consist, at the level of the passenger area, of different accessory components such as, in particular, glove boxes, ash or trash trays, bag or inflatable cushion restraint devices, or other items.

These accessories are planned to stay fixed and do not allow any modularity. The instrument panels currently known are thus, right now, not designed in order to allow adaptations of the vehicle to the activities of its occupants after installation. Moreover, the storage spaces that they have are limited.

The purpose of the invention presented here is to offer, by a unique structure having a variable configuration, different vehicle constructions by proposing an instrument panel which eliminates the aforementioned disadvantages and makes it possible to accommodate different accessory components in a modular manner, making it possible to change it based on the vehicle uses.

Another purpose of the invention presented here is to propose an instrument panel having a configuration which can be adjusted by the vehicle users themselves.

Another purpose of the invention presented here is to propose an instrument panel for an automobile which makes it possible to enjoy an enlarged storage space.

Other purposes and advantages of the invention presented here appear in the course of the following description which is only given as a guideline and is not intended to restrict it.

SUMMARY OF THE INVENTION

The invention involves an instrument panel for a vehicle, particularly for an automobile, comprising:
- at least one first reserved space, designed at least to accommodate different components of interior accessories and defined at least partially at the level of one casing component, and concealing at least partially the running board of the aforementioned vehicle,
- framework mechanisms acting together with the aforementioned casing component and/or the aforementioned first reserved space, the aforementioned accessory components being fitted to be secured to the walls of the aforementioned first reserved space and planned to be detachable.

BRIEF DESCRIPTION OF THE DRAWING

The invention presented here will be better understood in reading the following description, accompanied by the attached drawings which make up an integral part of it and among which.

DETAILED DESCRIPTION OF THE DRAWING

The invention presented here involves an instrument panel for a vehicle, in particular, an automobile.

However, though it is most particularly planned for applications of this sort, it can also be used in any other type of nautical, air, or land vehicle.

Figure 1:
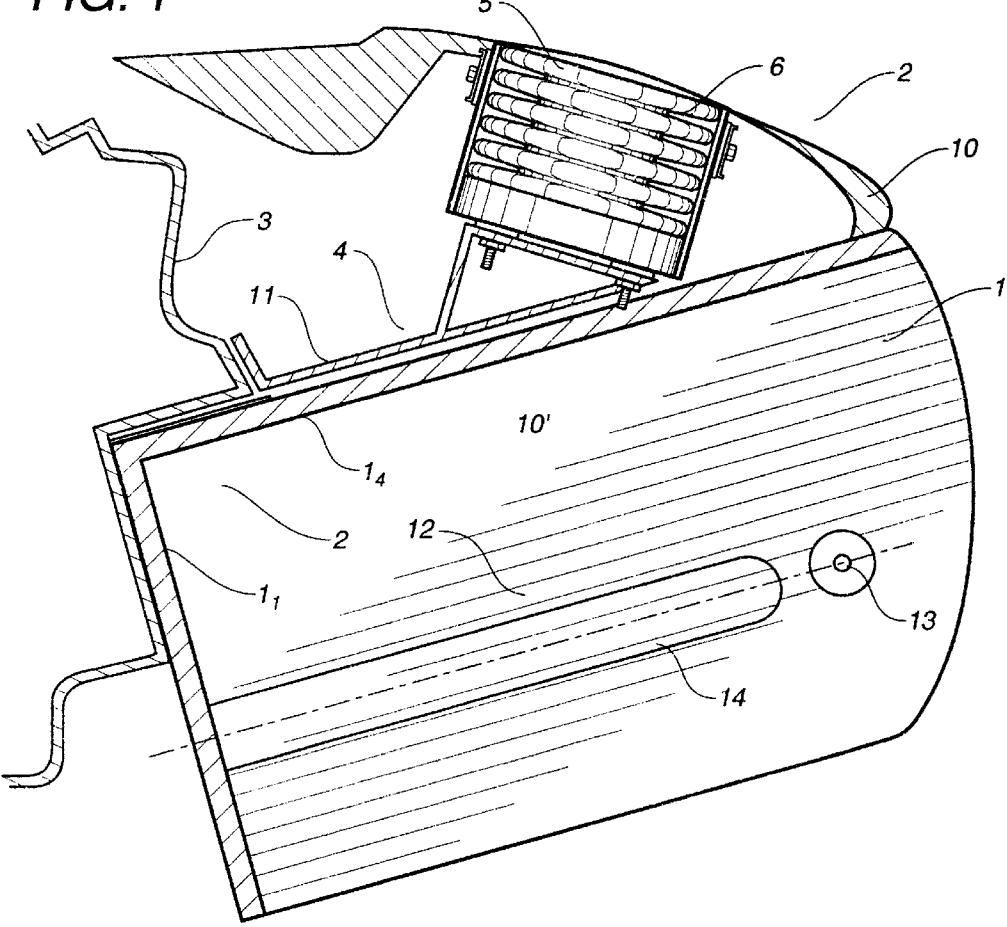
FIG. 1 is a sectional view, according to a transverse plane, of an embodiment example of the instrument panel according to the invention, FIG. 2 describes, in a perspective view, the instrument panel shown in the preceding FIG. 1, FIG. 3 describes, in a perspective view, another embodiment example of the instrument panel according to the invention.
Figure 2:
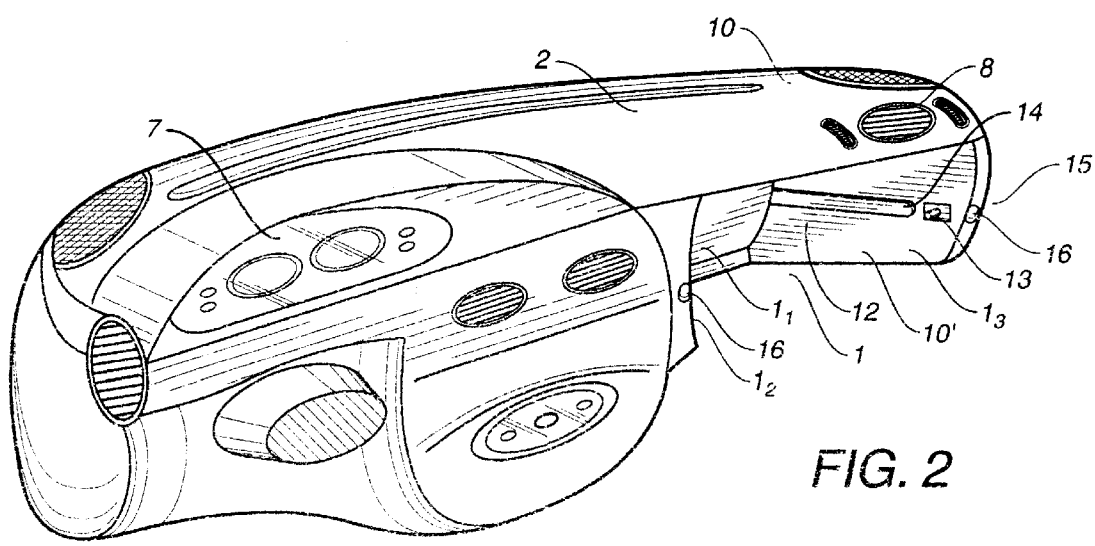
Figure 3:
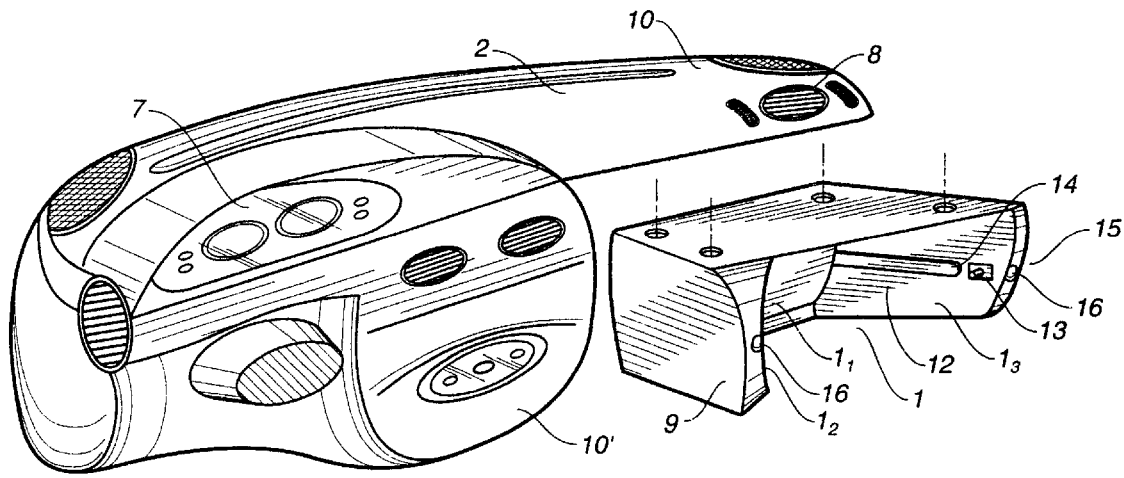

As shown in FIGS. 1 to 3, the instrument panel according to the invention includes at least one first reserved space 1, designed at least to accommodate different interior accessory components, not shown in these figures.

The aforementioned first reserved space 1 is defined, at least partially, at the level of a casing component 2, this casing component concealing, at least partially, the running board 3 of the aforementioned vehicle. The "running board" is understood to be the wall separating the passenger compartment from the motor compartment.

Moreover, the instrument panel according to the invention, includes the framework mechanisms 4 acting together with the aforementioned casing component 2 and/or the aforementioned first reserved space 1.

With the aforementioned accessory components being fit to be secured to the walls $1_1$, $1_2$, $1_3$, $1_4$ of the aforementioned reserved space 1 and planned to be detachable, the instrument panel according to the invention thus has a configuration which allows it to vary with the desires of the vehicle passengers.

Moreover, when the aforementioned first reserved space 1 is not occupied by one such detachable accessory component, a large storage space is thus available, in particular at the level of the front passenger area.

For this, the aforementioned reserved space 1 is, for example, open in the direction of the floor of the passenger compartment. It is defined, in particular, by at least two walls and has, for example, a roughly parallelepiped form.

According to the embodiment mode shown, the aforementioned reserved space 1 is equipped with a floor wall $1_1$, two side walls $1_2$, $1_3$, and a top wall $1_4$. According to another embodiment mode, the aforementioned reserved space 1 does not have a side wall $1_3$, in particular, of the side oriented towards the door of the vehicle. A device of this type can make it easier to manipulate the aforementioned detachable components.

The available volume has, for example, a large capacity, in particular, greater than 10 liters.

In this regard, it is to be noted that the aforementioned casing component 2 conceals, in addition, for example, different accessory components 5, planned to stay fixed, such as a bag restraint device or inflatable cushion 6, an instrumentation case 7, different components 8 of a device for the ventilation, heating, and/or air conditioning, electrical cable harnesses or the like.

With these different components occupying a minimum spatial requirement, it can be necessary with reference to the vehicles currently known, to provide, without it presenting great difficulty, a slight possible offset of the running board 3 towards the motor compartment in order to be able to house all of them under the aforementioned casing component 2, the aforementioned reserved space 1 itself occupying at least partially, the space previously intended for the aforementioned permanent accessory components 5.

The aforementioned casing component 2 includes, for example, one or more hulls 10, 10', possibly pre-formed. According to a first embodiment mode, corresponding to the one shown by FIG. 2, the aforementioned walls $1_1$, $1_2$, $1_3$, $1_4$ of the aforementioned first reserved space 1 are defined directly by the aforementioned casing component 2, thus having its flanks set back.

According to another embodiment mode corresponding to that shown in FIG. 3, the aforementioned first reserved space 1 is made by a compartment 9 fitted to be secured to the aforementioned casing component 2 and/or to the aforementioned framework mechanisms 4; the walls $1_1$, $1_2$, $1_3$, $1_4$ of the aforementioned first reserved space 1 being thus defined by those of the compartment 9.

This involves either a compartment cast as a single piece or a multi-component compartment. As developed further, the aforementioned compartment 9 is possibly planned to be identical for a vehicle which has its steering either to the left or to the right.

In regard to the aforementioned framework mechanisms 4, they can be made, according to a first embodiment mode, of the aforementioned casing component 2 itself, thus provided from the self-supporting structure. For this, the aforementioned casing component 4 is made up of, for example, a material which is locally rigidities.

If reference is made again to FIG. 1, it is noted that according to another embodiment mode, possibly able to act together with the one previously mentioned, the aforementioned framework mechanisms 4 include a bracket 11, secured to the aforementioned running board 3 and to at least one of the walls of the aforementioned first reserved space 1.

The aforementioned framework mechanisms 4 thus allow, in specific, for the reinforcement of the instrument panel according to the invention, at least locally at the level of the walls of the aforementioned reserved space 1, so as to allow the support of the detachable accessory components, even of increased weight.

The aforementioned bracket 11 acts together, for example, with the top wall $1_4$ the aforementioned first reserved space 1. In addition, it defines, if necessary, a support for the bag or inflatable cushion restraint device 6.

According to a specific embodiment example, also developed further, the aforementioned bracket 5 is planned longitudinally along the aforementioned instrument panel so as to define a strut to reinforce against lateral crashes.

The aforementioned strut is made of, for example, magnesium and/or reinforced thermoplastic.

It can also define, if necessary, a reinforcement for one of the side walls $1_3$ of the aforementioned first reserved space 1 by extension of the aforementioned bracket 11 in a plane orthogonal to the aforementioned strut. A device of this type makes it easier, in particular, to manage the attachment of the detachable accessories as well as to adjust the corresponding finishing and clearances.

The aforementioned bracket 11 can be equipped, in addition, if necessary, with a tension recovery bar, not shown, secured at a second point to the aforementioned running board 3.

This being the case, as depicted by the different embodiment examples shown, the aforementioned first reserved space 1 is equipped at the level of its walls with mechanisms 12 for holding and/or affixing the aforementioned detachable accessory components.

This involves, for example, a projection 13 and/or a rail 14, formed in the side walls $1_2$, $1_3$ of the aforementioned first reserved space 1.

The aforementioned projection 13 is planned, in particular, on each one of the aforementioned side walls. It is, for example, retractable into the depth of these aforementioned side walls $1_2$, $1_3$ in a manner so as to allow a locking of the aforementioned detachable accessory components.

The aforementioned rail 14 is made up of, for example, a protuberance planned, at least partially, along each of the aforementioned lateral sides $1_2$, $1_3$, for example, at the level of their longitudinal axis of symmetry.

The aforementioned projection 13 is located, in particular, in the extension of the aforementioned rail 14.

When the reserved space 1 is equipped, as previously mentioned, with a single side wall $1_2$, the aforementioned holding and/or rigid fixing mechanisms 12 can be provided, in addition, at the level of the aforementioned top wall $1_4$.

If reference is now made to FIGS. 4 to 10, it is noted that the running board according to the invention includes, if necessary, in addition, in order to make it easier to position and/or remove the aforementioned detachable accessory components, control mechanisms 15 for the aforementioned operations.

This involves, for example, control buttons 16, fitted to determine the displacements of the aforementioned projections 13, the aforementioned control buttons 16 being planned at the periphery of the aforementioned reserved space 1. For example, one such aforementioned control button 16 is provided on each side of the side walls $1_2$, $1_3$ of the aforementioned reserved space 1.

Thus, in order to be able to detach the installed detachable accessory component, it is necessary to simultaneously activate the two control buttons 16; this arrangement is aimed at improving security in order to avoid any untimely pulling out of an aforementioned detachable accessory component.

In a manner so as to make operations easier, the aforementioned control buttons 16 are equipped, if necessary, with light emitting diodes (LED's), blinking or colored, fitted to signal correct installation and/or the different stages to follow in order to remove such a detachable accessory component.

In addition, the aforementioned reserved space 1 is made up of, for example, a pressure plate, planned at the level of its bottom wall $1_1$, fitted to make easier the detachment of some of the aforementioned detachable accessory components.

The reserved space 1 can also be equipped, in particular, at the level of the aforementioned wall $1_1$ of the bottom of the reserved space 1, with an electric tap, not shown, fitted to supply the aforementioned detachable accessory components which require it.

In this regard, these accessory components are made up, for example, of a storage case 17, refrigerated or not, of a compartment which can open out 18 or not open out 19, a rod support 20, a foot rest 21 and/or an information emission, reception and/or display station 22, 23.

Figure 4:
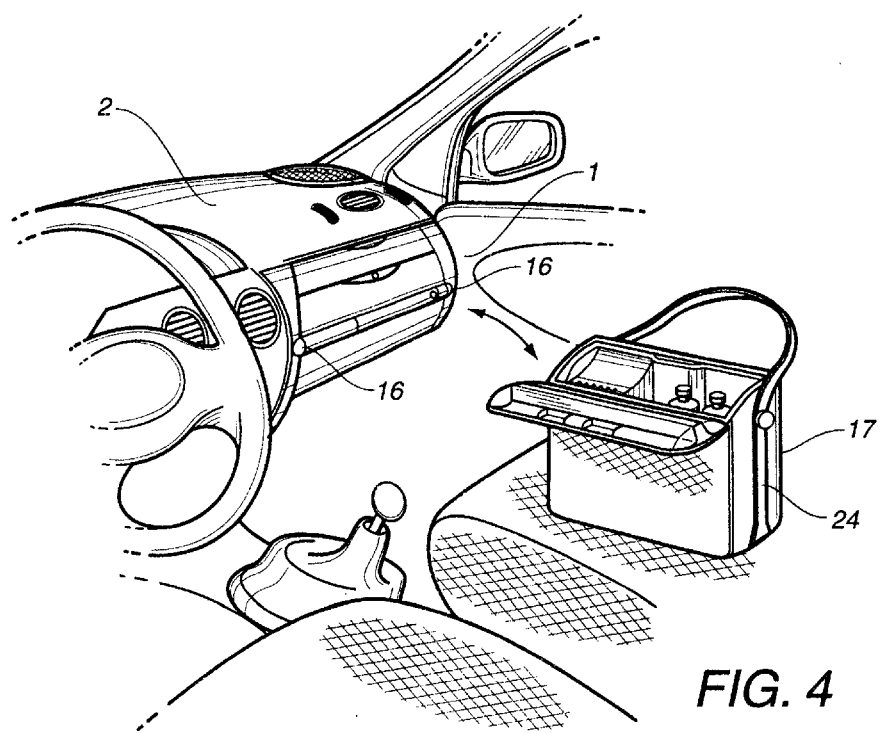
FIGS. 4 to 10 show, in a perspective view, different embodiment examples of the instrument panel according to the invention.

In so far as the aforementioned storage case 17 is concerned, shown in FIG. 4, you can refer, for more details on the structure, to the description which is made in the French patent application FR-96/14.493, the installation and/or removal of the aforementioned storage case 17 being made, in particular, by the use of a groove 24 and/or an opening, provided on its side walls, fitted to act together, respectively, with the aforementioned rail 14 and/or the aforementioned projection 13.

Figure 5:
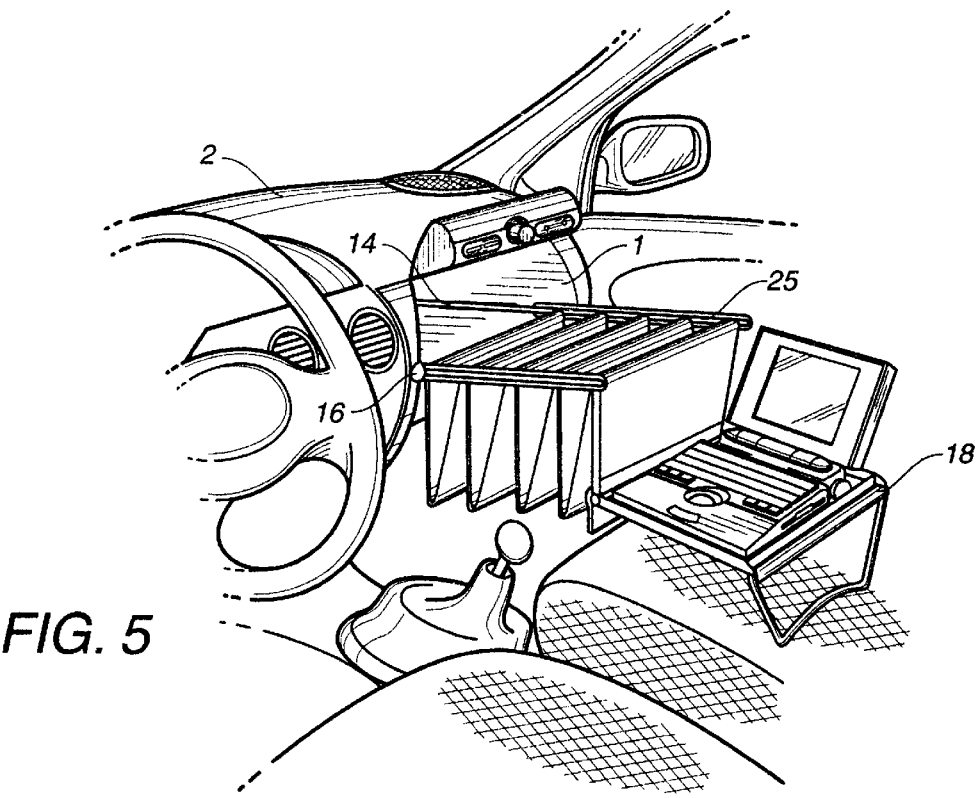

The compartment which can open out 18, depicted in FIG. 5, is itself mounted, for example, on the rods 25 fitted to act together with the aforementioned rails 14, the aforementioned compartment which can open out 18 being adjustable relative to the aforementioned rods 25.

Figure 6:
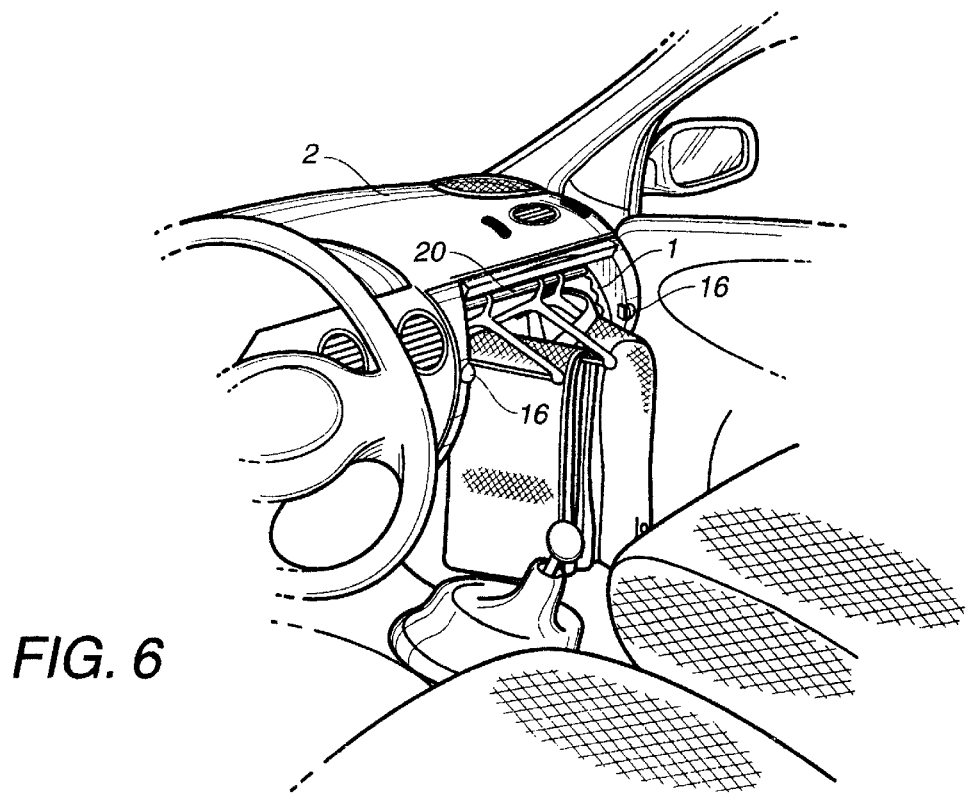
Figure 7:
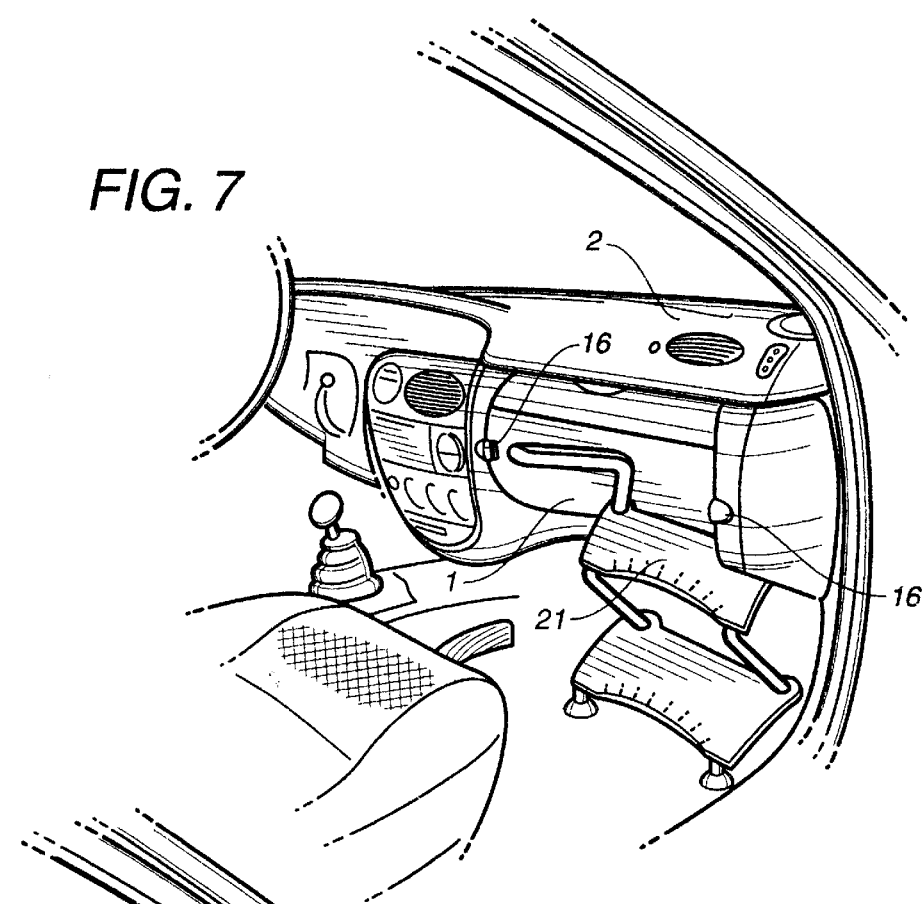

In so far as the support rod 20 and/or the foot rest 21, depicted in FIGS. 6 and 7 respectively, are concerned, they are clipped on at the level of the aforementioned projection 13 and/or of the aforementioned rail 14, for example, directly or by the use of the contact arm.

Figure 8:
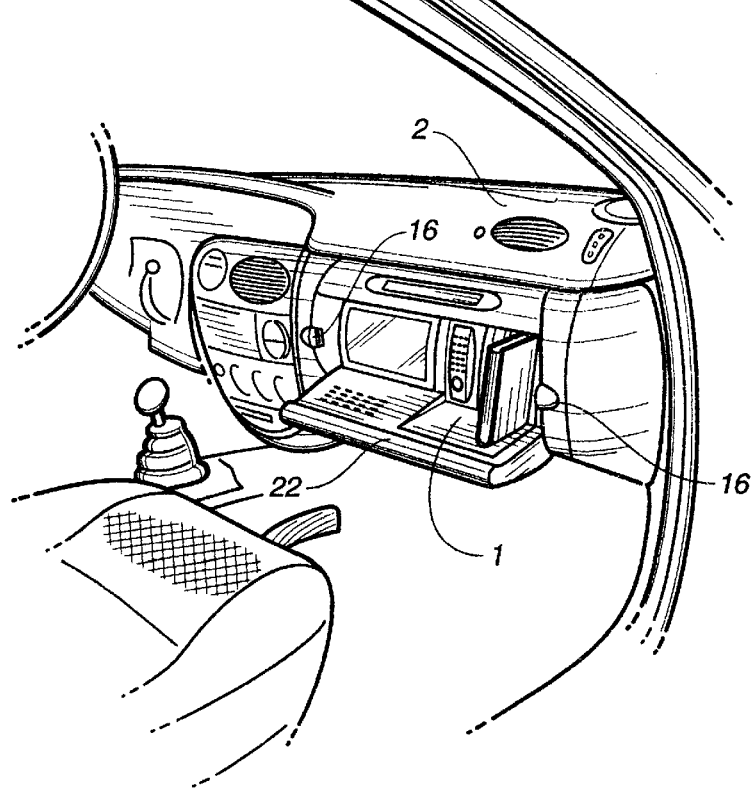
Figure 9:
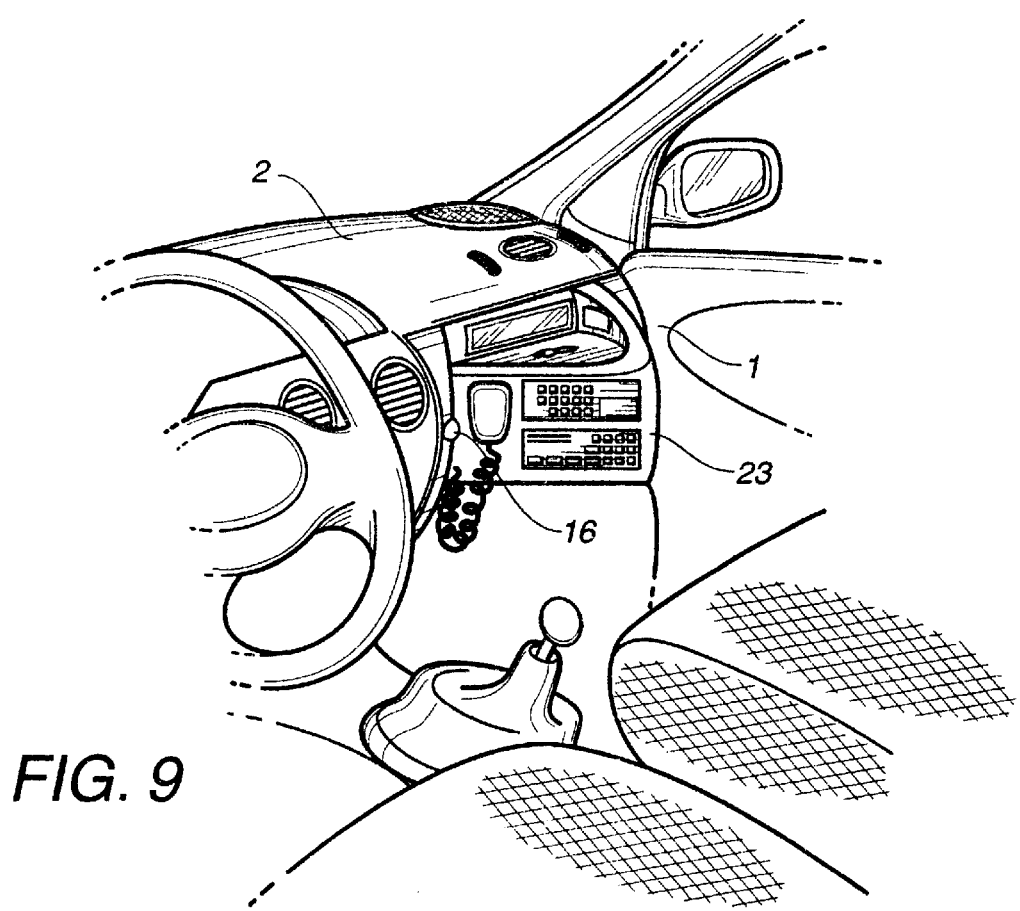

As for the aforementioned information emission, reception and/or display stations 22, 23, depicted in FIGS. 8 and 9, they are integrated into the enclosures having, for example, the same outside structure as the aforementioned storage case 17.

Figure 10:
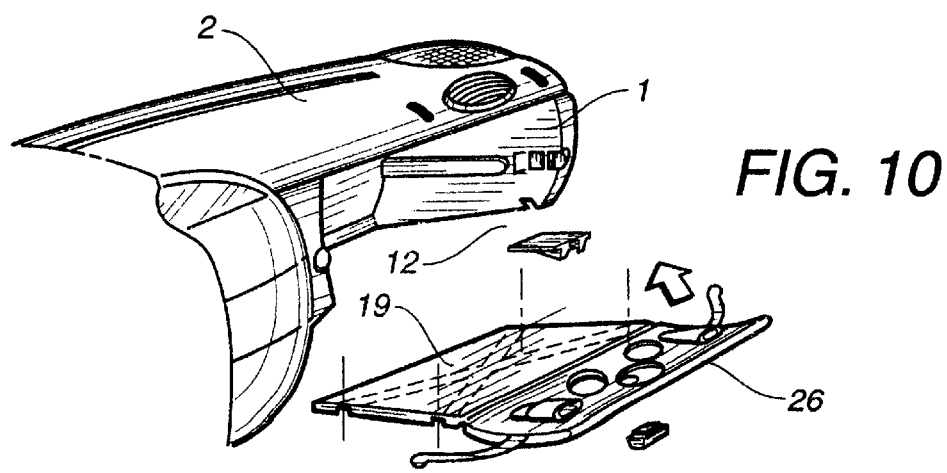

Finally, as depicted in FIG. 10, the aforementioned first reserved space 1 can be equipped with the aforementioned compartment which can not open out 19, possibly accompanied by an adjustable cover 26, the assembly thus defining a customary glove box, the aforementioned compartment which can not open out 18 can be easily adjusted, for example, by screwing on and/or screwing off, on the walls of the aforementioned first reserved space 1.

This being the case, according to a particular embodiment mode not shown, the aforementioned running board has, for example, a second reserved space, symmetrical to the first one relative to the median plane of the vehicle, and having a similar structure and/or framework, the aforementioned reserved spaces being fitted to receive alternatively an aforementioned detachable accessory component or a conduit block. "Conduit block" is understood to be an assembly which groups together, in particular, a steering column, a pedal and/or other items, fitted to be implemented at the level of the driver's area.

A solution of this sort makes it easier to diversify the installation at a later time, the only choice remaining to be made at the end being that of the localization to the right or to the left of the conduit block, the other reserved space being left open in order to accommodate one of the aforementioned detachable accessory components.

The aforementioned second reserved space might be itself defined by one of the aforementioned compartments 9. Moreover, the framework of the aforementioned second reserved space can also be reinforced, if necessary, by a bracket 11, existing, in particular, in the form of a cross strut, such as previously mentioned, the aforementioned strut being then itself also provided symmetrically relative to the median plane of the vehicle.

In addition, a central installation of the aforementioned reserved space 1, possibly including one of these aforementioned compartments 9, can also be provided in an alternative or supplemental manner to the ones previously mentioned. A device of this type makes possible a very sizable spatial clearance. Moreover, it is favorable to the economics of the vehicle, in particular, in case of vehicles having a large width such as commercial or space vehicles.

Of course, other embodiment modes, within the grasp of the expert, could have been imagined without going outside of the frame of the invention.

I claim:

1. Instrument panel for a vehicle, particularly for an automobile, comprising at least one first reserved space (1) defined at least partially at the level of one casing component (2), concealing at least partially, the running board (3) of the aforementioned vehicle, a plurality of interchangeable interior accessory components (17–23), framework mechanisms (4) acting together with the aforementioned casing component (2) and/or the aforementioned first reserved space (1), the aforementioned accessory components (17–23) being fitted to be detachably secured to the walls ($1_1$, $1_2$, $1_3$, $1_4$) of the aforementioned first reserved space (1).

2. Instrument panel according to claim 1, in which the casing component (2) comprises, one or more hulls (10, 10').

3. Instrument panel according to claim 1, wherein the aforementioned first reserved space (1) is made by a compartment (9) fitted to be secured to the aforementioned casing component (2) or to the aforementioned framework mechanisms (4).

4. Instrument panel according to claim 1, wherein the aforementioned framework mechanisms (4) comprises a bracket (11), secured to the aforementioned running board (3) and to at least one of the walls ($1_4$) of the aforementioned first reserved space (1).

5. Instrument panel according to claim 4, wherein the aforementioned bracket (11) defines, in addition, a support for a bag or inflatable cushion restraint device (6).

6. Instrument panel according to claim 4, wherein the aforementioned bracket (11) extends longitudinally along the aforementioned instrument panel so as to define a strut to reinforce against lateral crashes.

7. Instrument panel according to claim 1, wherein the aforementioned first reserved space (1) is equipped at the level of its walls ($1_2$, $1_3$) with means (12) for holding or affixing the aforementioned detachable accessory components (17–23).

8. Instrument panel according to claim 7, wherein the aforementioned holding or affixing means (12) consist of at least one projection (13) and/or one rail (14), formed in the side walls ($1_2$, $1_3$) of the aforementioned first reserved space (1).

9. Instrument panel according to claim 1, wherein the aforementioned accessory components are made up of a storage case (17), of a compartment which can open out (18) or not open out (19), a rod support (20), a foot rest (21) and/or an information emission, reception and/or display station (22, 23).

\* \* \* \* \*